March 11, 1941.   M. MALLORY   2,234,267

INTERNAL COMBUSTION ENGINE

Filed May 26, 1939

INVENTOR
MARION MALLORY
BY
Barnes, Kisselle, Laughlin & Raisch
ATTORNEYS.

Patented Mar. 11, 1941

2,234,267

UNITED STATES PATENT OFFICE 2,234,267

INTERNAL COMBUSTION ENGINE

Marion Mallory, Detroit, Mich.

Application May 26, 1939, Serial No. 275,937

3 Claims. (Cl. 123—53)

This invention relates to an internal combustion engine. The invention relates more particularly to an internal combustion engine in which each power unit comprises a pair of pistons operating in a pair of cylinders which are in continuous communication with each other. The cylinders are provided with separate intake manifolds each controlled by separate throttle valves and intake valves. Each cylinder is given a separate charge, which charges are segregated from each other during the intake and compression strokes of the engine even though the two cylinders are continuously in communication.

One of the main objects of the invention is to prevent the two charges, one for each of the cylinders, from commingling with each other on the intake and compression stroke. This object is achieved by controlling the amount of charge admitted to the two cylinders at any throttle setting so that the pressures in the two cylinders will be the same. In other words, balanced, to prevent the two charges from commingling on both the intake and compression strokes.

Where the cylinders are the same size, that is, bore, this object is achieved by making the intake ports for each cylinder the same size, the intake manifolds and venturis for each cylinder the same size, the throttle valves for the manifolds the same size, and arranging the throttle valves so that they open and close in unison as the engine is throttled.

When the cylinders are of different sizes or unbalanced, the control that admits the charges must also be unbalanced. For example; if one of the cylinders were smaller than the other, it would be necessary to use a smaller venturi and a smaller throttle valve for the smaller cylinder than that used with the larger cylinder so as to keep the pressures on the intake stroke and compression stroke the same in the two cylinders at all throttle positions.

Figure 1:
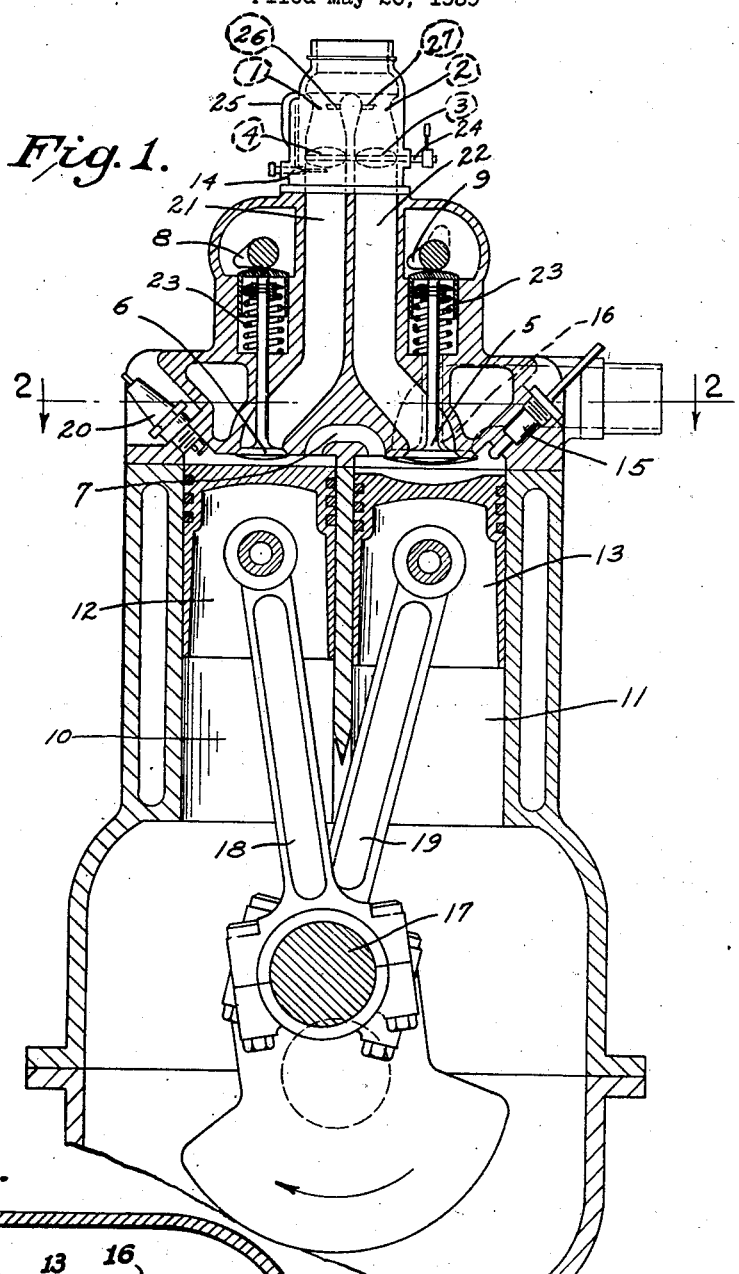
Figure 2:
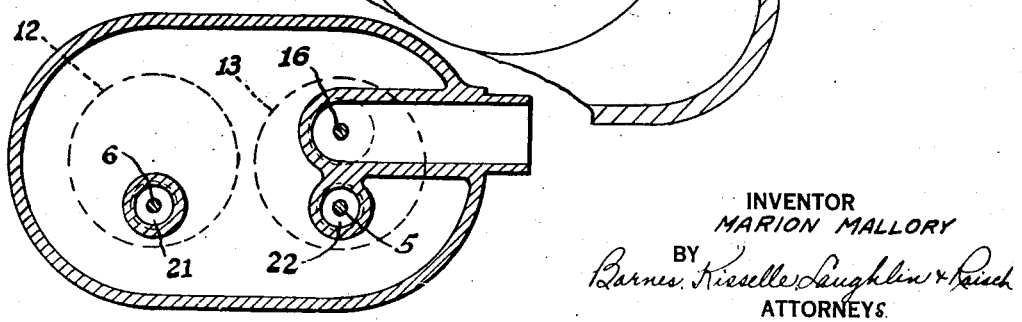

In the drawing Fig. 1 shows a vertical section through the engine which is the subject matter of this invention and Fig 2 is a section along the line 2—2 of Fig. 1.

The cylinders 10 and 11, for purposes of description rather than by way of limitation, are of the same size. The upper ends of the cylinders above the pistons are in continuous communication by means of a port or passageway 7. The cylinders 10 and 11 are provided with the usual pistons 12 and 13 which are connected to a common crankshaft 17 by connecting rods 18 and 19 respectively. The pistons are arranged so that on the compression stroke piston 12 slightly leads piston 13. However, since the pistons 12 and 13 are connected to a common crank of the crankshaft 17 they have strokes of equal lengths.

The head of cylinder 10 is provided with an electric spark-plug 20 for igniting the fuel and air mixture in the combustion chamber of cylinder 10.

Cylinders 10 and 11 are provided with intake manifold passageways 21 and 22 respectively of identical sizes. Manifold passageway 21 communicates with cylinder 10 through an intake port controlled by intake valve 6 and manifold passageway 22 communicates with cylinder 11 by an intake port controlled by intake valve 5. The two intake valves 6 and 5 are opened in unison by cams 8 and 9 respectively and closed in unison by the usual compression springs 23. Manifold passageway 21 is controlled by butterfly throttle valve 4 and manifold passageway 22 is controlled by butterfly throttle valve 3. Throttle valves 3 and 4 are fixed to a common shaft 24 and opened and closed in unison.

The engine is provided with a duplex carburetor, generally designated 25, which is connected with a source of liquid fuel (not shown) in the customary manner. The carburetor is provided with venturis 1 and 2 which communicate respectively with manifold passageways 21 and 22. Cylinder 11 is provided with an exhaust port controlled by exhaust valve 16 which is operated in the well known manner from the same cam shaft that operates the intake valve 5.

The carburetor which supplies the fuel and air mixture to cylinder 10 has an idle bypass 14. When the engine is working under no load or idling an idling fuel mixture is admitted to cylinder 10 only and nothing but air is admitted into the cylinder 11. Thus when the engine is idling the power is generated in cylinder 10 only.

The carburetor venturis 1 and 2 are provided with fuel nozzles or jets 26 and 27 respectively. Cylinder 11 is also provided with a fuel injection nozzle 15 which is connected to a fuel pump, not shown, in the conventional manner. The use of the injection nozzle 15 is optional. If it is desired to inject the fuel into cylinder 11 by injection nozzle 15, then the carburetor for manifold 22 is turned off so that no fuel is drawn from nozzle 27 and air only passes through venturi 2 and by throttle valve 3.

The two cylinders 10 and 11 represent one power unit corresponding to the single cylinder of the conventional engine. In other words, if the engine had four pairs of cylinders 10 and 11

(eight cylinders total) the intervals at which the explosions would occur would be the same as in a conventional four cylinder engine.

From the above it is evident that the same amount of charge will be drawn into each cylinder on the intake stroke of the pistons because the throttle valves 3 and 4 work in unison and venturis 1 and 2 are the same size and the same is true of the inlet ports controlled by valves 5 and 6. When the cylinder 11 is working on injection the charge drawn through intake manifold 22 will consist of air only and will not become a fuel mixture until the fuel is injected through injection nozzle 15. Naturally, the injection of solid fuel through nozzle 15 takes place on the compression stroke and the amount of fuel injected will be regulated so that the volume of fuel is increased or decreased correspondingly as the air charge is increased or decreased by throttle valve 3.

On the intake stroke of the pistons, the vacuums in the two cylinders will be balanced, which causes the vacuum in the one cylinder to oppose the vacuum in the other and prevent the charge in one cylinder from being drawn through passageway 7 into the other cylinder. This same condition exists on the compression stroke of the pistons, because, if the charging pressures are the same in each cylinder, the compression pressures will be the same in each cylinder. Naturally, balanced compression pressures oppose each other and prevent the charge from one cylinder passing into the other cylinder. Of course, piston 12 leads piston 13 on the compression stroke and there will be a slight amount of the charge in cylinder 10 forced over into cylinder 11 at the end of the compression stroke of piston 12 but this is not objectionable. This condition is favorable because at no time is the mixture in cylinder 10 diluted by the air charge or lean mixtures in cylinder 11. Further, whatever combustible mixture is forced out of cylinder 10 into cylinder 11 will act as kindling to assist the burning of the lean mixture or expand the air that is in cylinder 11.

The main object of the invention is to keep the charges segregated so that a combustible mixture can be maintained in cylinder 10 and air alone can be used in cylinder 11, which latter condition obtains when the engine is idling, or vary the fuel mixture from air to a combustible mixture in cylinder 11 and under all these conditions prevent the charge admitted to cylinder 11 from mixing with the mixture admitted to cylinder 10.

If it is desired to use carburetted mixutres in both cylinders 10 and 11 the fuel emitted from jet 27 may be gasoline, the same as used in cylinder 10 or may be a lower grade fuel if desired.

As the pistons draw in the two charges and then compress them a spark occurs at the sparkplug in cylinder 10 causing an explosion to take place over piston 12. The flame passing through communication 7 ignites the charge over piston 13.

From the above, it is evident that there is produced an engine having dual cylinders or combustion chambers in continuous communication, each provided with separate means for supplying fuel mixtures which are so controlled that the pressures in the cylinders both on the compression and intake strokes of the pistons are maintained substantially the same so that no commingling of the separate charges in the cylinders takes place either during intake or compression.

I claim:

1. In an engine having two cylinders and reciprocating pistons therein, the said cylinders and pistons cooperating to define two combustion chambers, a communication between the two combustion chambers which is open continuously, separate intake manifolds connected to the intake ports of each of the cylinders, a fuel carburetor connected to at least one of said manifolds, intake valves for said intake ports, and throttle valves for said intake manifolds, the said throttle valve, intake manifold, and intake port and valve for the one cylinder being coordinated in operation and size with the intake manifold, throttle valve, intake port and valve of the other cylinder whereby the pressure in the combustion chambers of both cylinders are maintained approximately equal during the intake and compression strokes of the pistons.

2. An internal combustion engine comprising two cylinders, a piston for each of said cylinders, a crankshaft, connecting rods for connecting the pistons to the common crankshaft whereby the pistons reciprocate with strokes of equal lengths, the said pistons cooperating with the cylinders to form combustion chambers, a continuously open communication between the two combustion chambers, a carburetor having a fuel jet and an idling by-pass, an intake manifold connecting the carburetor, fuel jet and idling by-pass to the inlet port of one of said cylinders, an intake manifold connected to the inlet port of the other cylinder, means for supplying fuel to said last mentioned cylinder whenever the engine is operating under load, throttle valves for said manifolds and intake valves for said intake ports operating to open and close simultaneously whereby the pressure in the intake manifold and in the two cylinders is balanced on the compression and intake strokes of the pistons and the fuel mixture drawn into the one cylinder is segregated from the charge in the other cylinder during the intake and compression strokes of the pistons.

3. In an engine having two cylinders of equal size and pistons reciprocating in unison therein, the said cylinders and pistons cooperating to define two combustion chambers, a communication between the two combustion chambers which is open continuously, separate intake manifolds connected to the intake ports of each of the cylinders, a fuel carburetor connected to at least one of said manifolds, intake valves for said intake ports, and throttle valves for said intake manifolds, the said throttle valve, intake manifold, and intake port and valve for the one cylinder being coordinated in operation and size with the intake manifold, throttle valve, intake port and valve of the other cylinder whereby the pressure in the combustion chambers of both cylinders are maintained approximately equal during the intake and compression strokes of the pistons.

MARION MALLORY.